Jan. 13, 1953  J. O. JACKSON  2,625,038
WIND TUNNEL AND STRAIGHT DUCT SECTION FOR SUCH TUNNELS
Filed Dec. 22, 1950  6 Sheets-Sheet 1
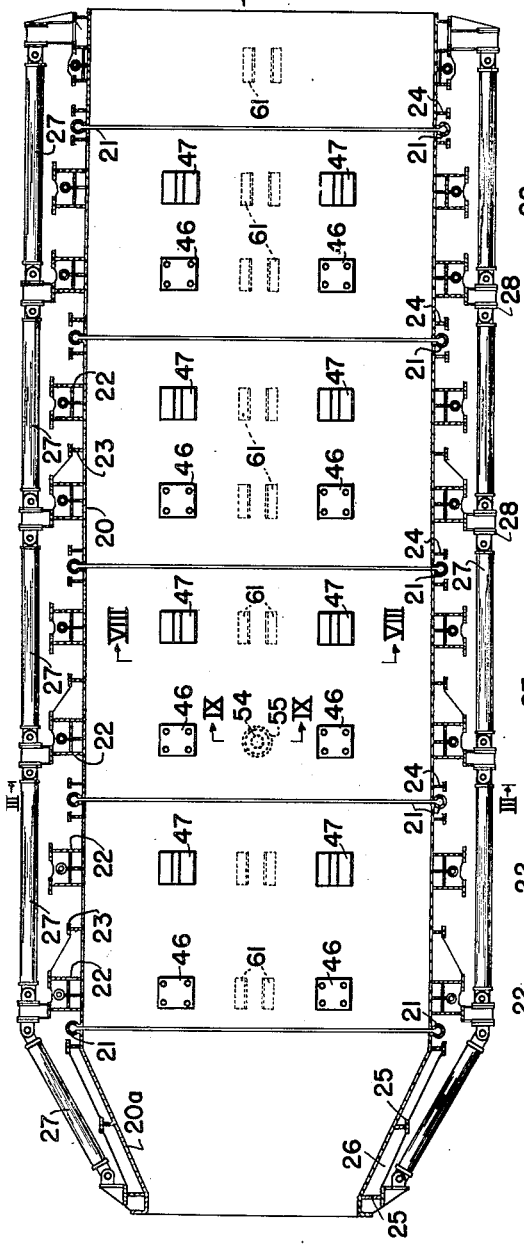
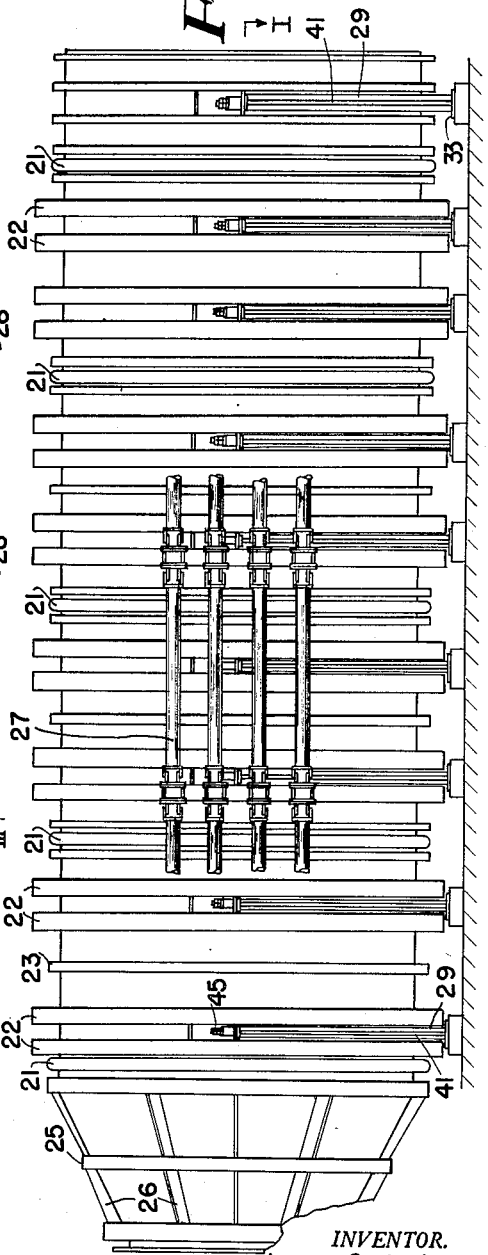
INVENTOR.
James O. Jackson
BY
HIS ATTORNEYS

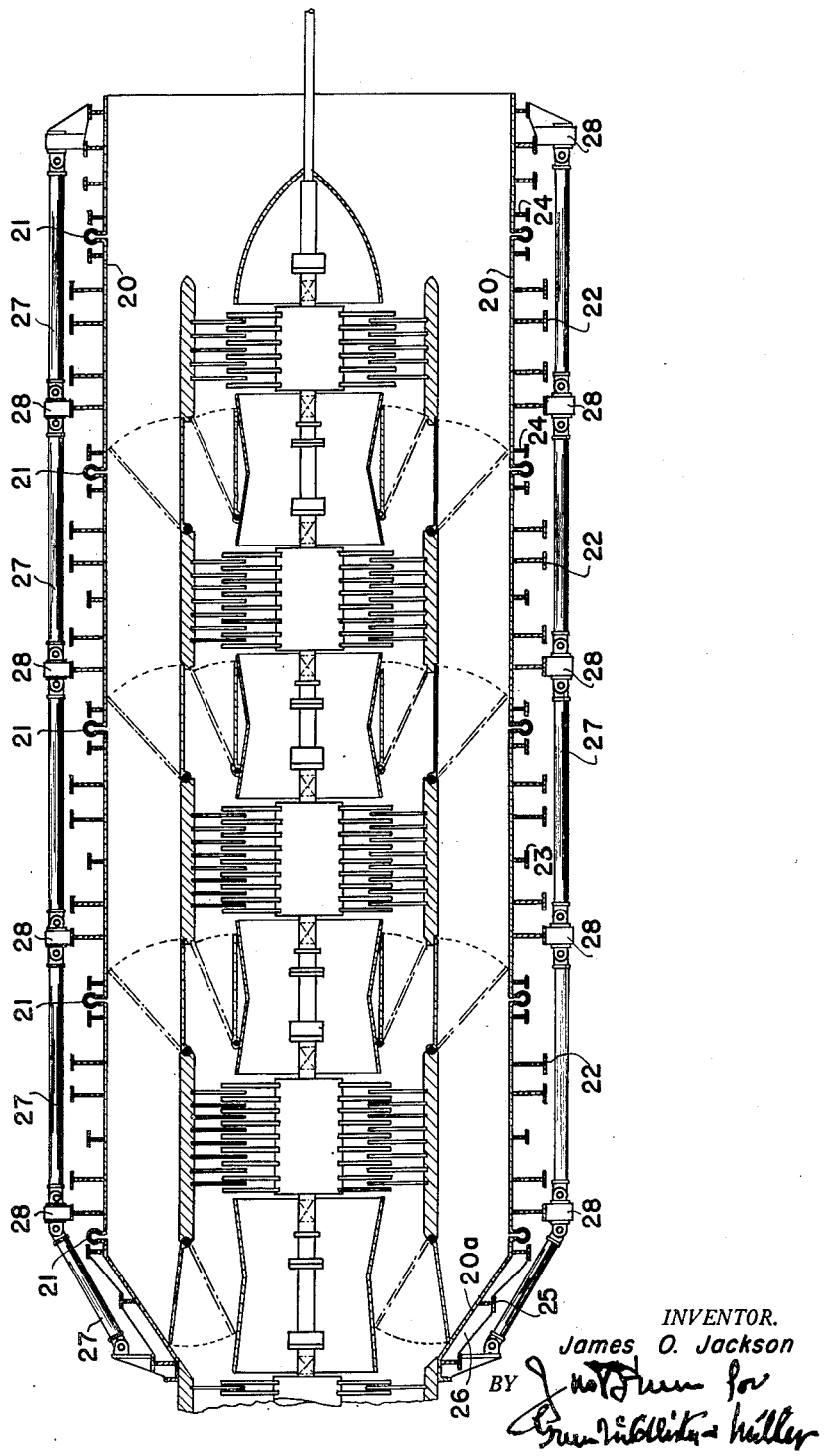

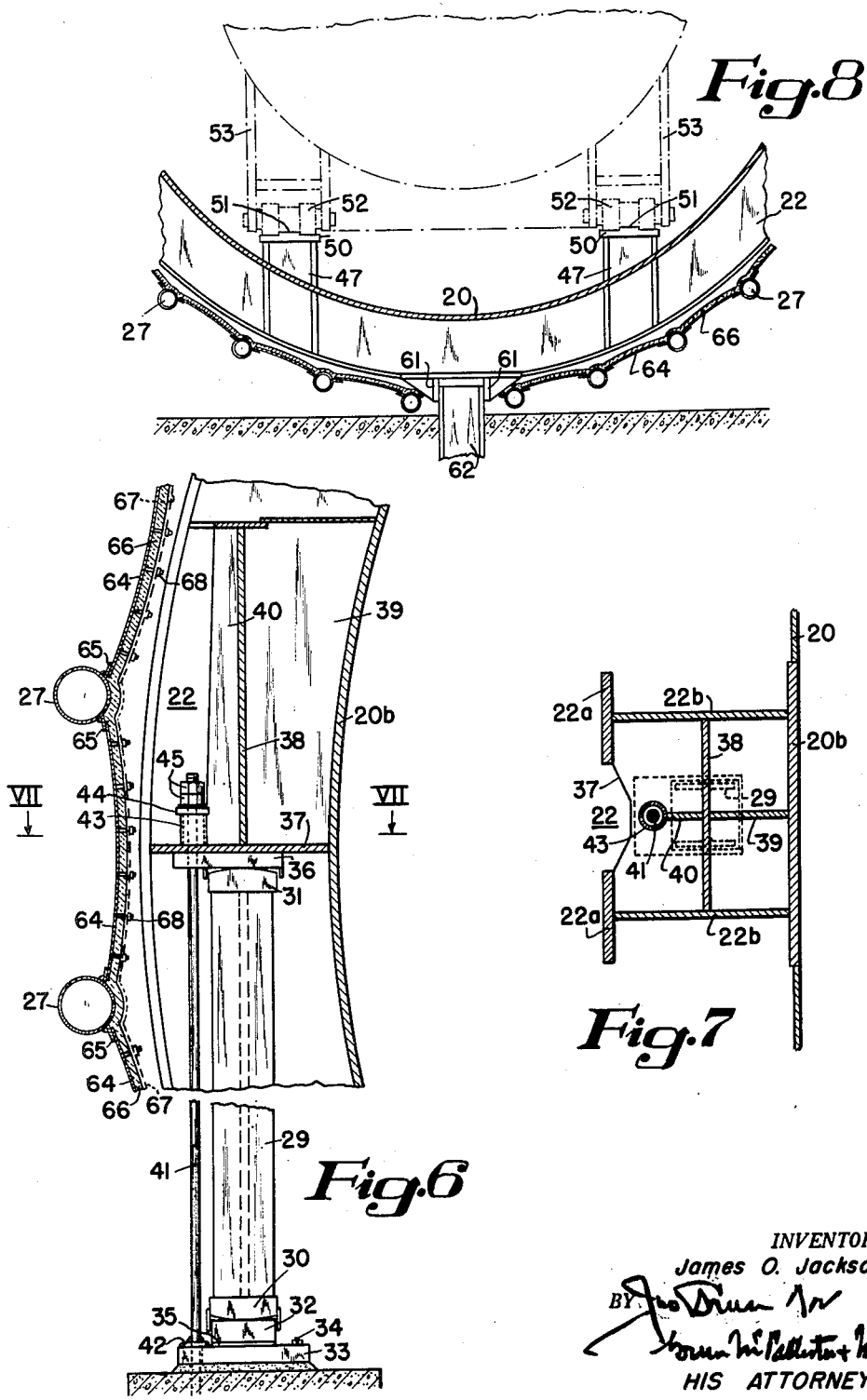

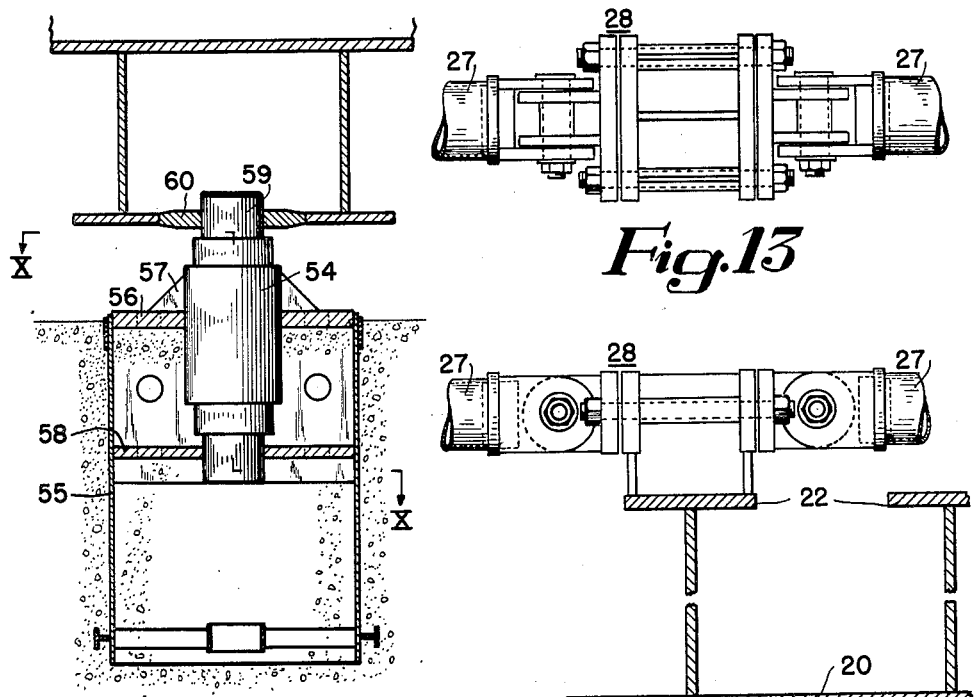

Patented Jan. 13, 1953

2,625,038

UNITED STATES PATENT OFFICE 2,625,038

WIND TUNNEL AND STRAIGHT DUCT SECTION FOR SUCH TUNNEL

James O. Jackson, Crafton, Pa., assignor to Pittsburgh-Des Moines Company, Pittsburgh, Pa., a corporation of Pennsylvania Application December 22, 1950, Serial No. 202,253

13 Claims. (Cl. 73—147)

This invention relates to wind tunnels and to straight duct sections such as found in the make-up of such wind tunnels.

These straight duct sections may be operated either above or below ambient temperature so that the material from which they are made changes dimensions due to thermal expansion and contraction. They may be subjected to either internal or external pressures and the dimensional changes due to thermal expansion and contraction may in certain cases be exceedingly objectionable.

An object of this invention is to produce an improved straight duct section such as may be employed in the make-up of a wind tunnel and which may be operated either above or below ambient temperature.

Another object is to produce a straight duct section which, although operated either above or below ambient temperature, has longitudinally spaced portions thereof which are fixed with relation to one another, while other portions which are intermediate such fixed portions are free to move with relation to such fixed portions due to thermal expansion or contraction of the duct material.

A further object is to produce a straight section of a wind tunnel which is fixibly supported, is heat insulated, resists internal and external pressures, adjusts itself to changes in temperature and can be used to house a series of axially aligned compressors and provide room for the installation of instrumentalities by which the tunnel flow may be bypassed around one or more of the compressors of such series.

These and other objects I attain by means of the structures described in the specification and illustrated in the drawings accompanying and forming part of this application.

In the drawings:

Figure 1 is a horizontal section of a straight duct section embodying this invention and is taken on line I—I of Fig. 2;

Fig. 2 is a sectional elevation of the duct section of Fig. 1;

Fig. 5 is a view similar to Fig. 1 and discloses the manner in which this straight duct section may serve as a bypass in a supersonic wind tunnel for a series of axial flow compressors arranged in tandem;

Fig. 6 is a more or less detail view of one of the column structures for supporting the duct section of this invention in such manner that it is free to expand above and below the horizontal plane which includes its longitudinal axis;

Fig. 7 is a horizontal section taken on line VII—VII of Fig. 6;

Fig. 8 is a fragmentary section taken on line VIII—VIII of Fig. 1;

Fig. 9 is a sectional view taken on line IX—IX of Fig. 1 and illustrates the manner of anchoring one part or portion of the shell of the straight duct section to the foundation and against longitudinal movement;

Fig. 10 is a sectional view taken on line X—X of Fig. 9;

Fig. 11 is a transverse section of one of the circumferentially extending expansion joints of the duct section and is taken on line XI—XI of Fig. 12;

Fig. 12 is a fragmentary view in side elevation of such expansion joint;

Fig. 13 is a view in top plan of a coupling means which may be used as shown for coupling two sections of one of the external anchor struts for tying together the portions of the duct shell that are to be fixed against longitudinal movement with relation to that portion of such shell which is anchored to the foundation by the means disclosed in Figs. 9 and 10;

Fig. 14 is a side elevational view of the coupling device of Fig. 13; and

Fig. 15 is an end view of such coupling device.

This invention in its simplest aspect comprises a straight metal duct or shell preferably of circular cross section to be operated either above or below the ambient temperature and because of this, the metal from which the same is made will change its dimensions due to thermal expansion and contraction.

In order that certain portions of such shell located at spaced intervals along its length may be fixed with relation to one another, I provide such shell with a number of spaced circumferentially extending expansion joints to take care of changes in the duct shell length. The shell portions which are to be fixed with relation to one another are located between such expansion joints and are tied together by means of an external system of pressure struts which are insulated from the duct shell and thus kept at ambient temperature.

Changes in height of the duct shell due to such expansion and contraction are taken care of by supporting the shell at such fixed portions on tiltable, foundation-supported side column members which have operative connection with such shell structure adjacent a horizontal plane which includes the longitudinal axis of the duct shell.

Figure 4:
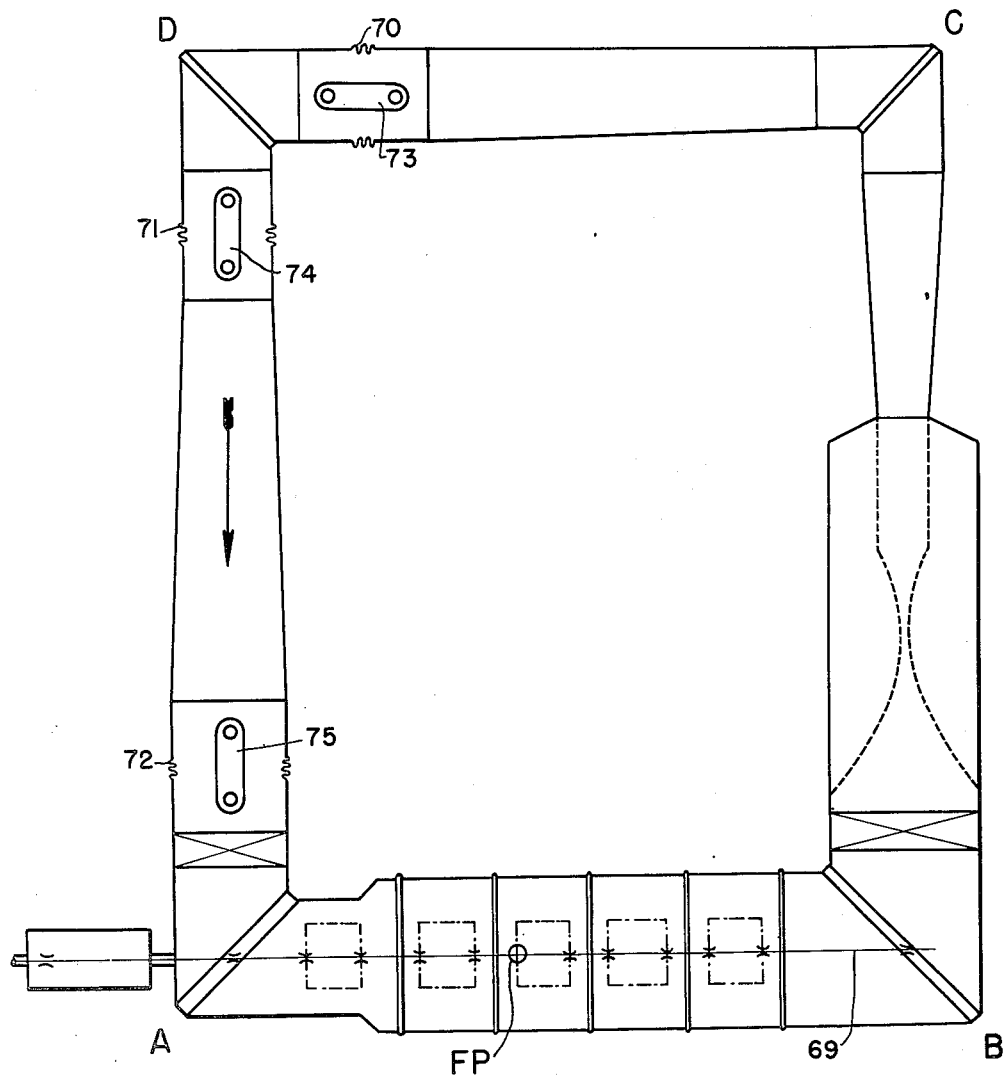
Fig. 4 is a more or less schematic showing of a supersonic wind tunnel employing as a bypass shell a straight duct section embodying this invention.

When this straight duct shell section is incorporated in a wind tunnel for the purpose of forming a housing and bypass for a number of axially aligned air compressors as disclosed in Figs. 4 and 5 of the drawings, I preferably anchor one of the fixed parts of such duct section to the wind tunnel foundation.

The straight duct section as disclosed in the drawings comprises a tubular metal shell 20 which is of circular cross section and is provided with a number of spaced expansion joints 21. Shell 20 is reduced in diameter as shown at 20a at what may be termed its upstream end, since it is designed to be used in the make-up of a wind tunnel.

Shell 20 between each two adjacent expansion joints 21 is provided with two built-up stiffening and supporting ring members which are numbered 22 as an entirety. A smaller stiffening ring 23 is located midway between each pair of ring members 22, and stiffening rings 24 similar to rings 23 are located on opposite sides of each of the expansion joints 21 except the expansion joint adjacent the upstream end of shell 20 which is located fairly close to the upstream stiffening ring member 22.

Conical section 20a by means of which the straight duct shell section reduces its diameter at its upstream end, is provided with a number of circumferentially extending stiffening rings 25 (three in this case) and radially extending stiffening ribs 26 which are connected to stiffening rings 25. The upper stiffening ring 25 is located at the junction of the cylindrical and conical sections of the duct.

In order to anchor or fix certain longitudinally spaced circumferentially extending portions of the duct shell 20 against longitudinal movement caused by expansion or contraction of the material forming such duct shell, I tie such sections together by means of tie members or struts 27.

Figure 3:
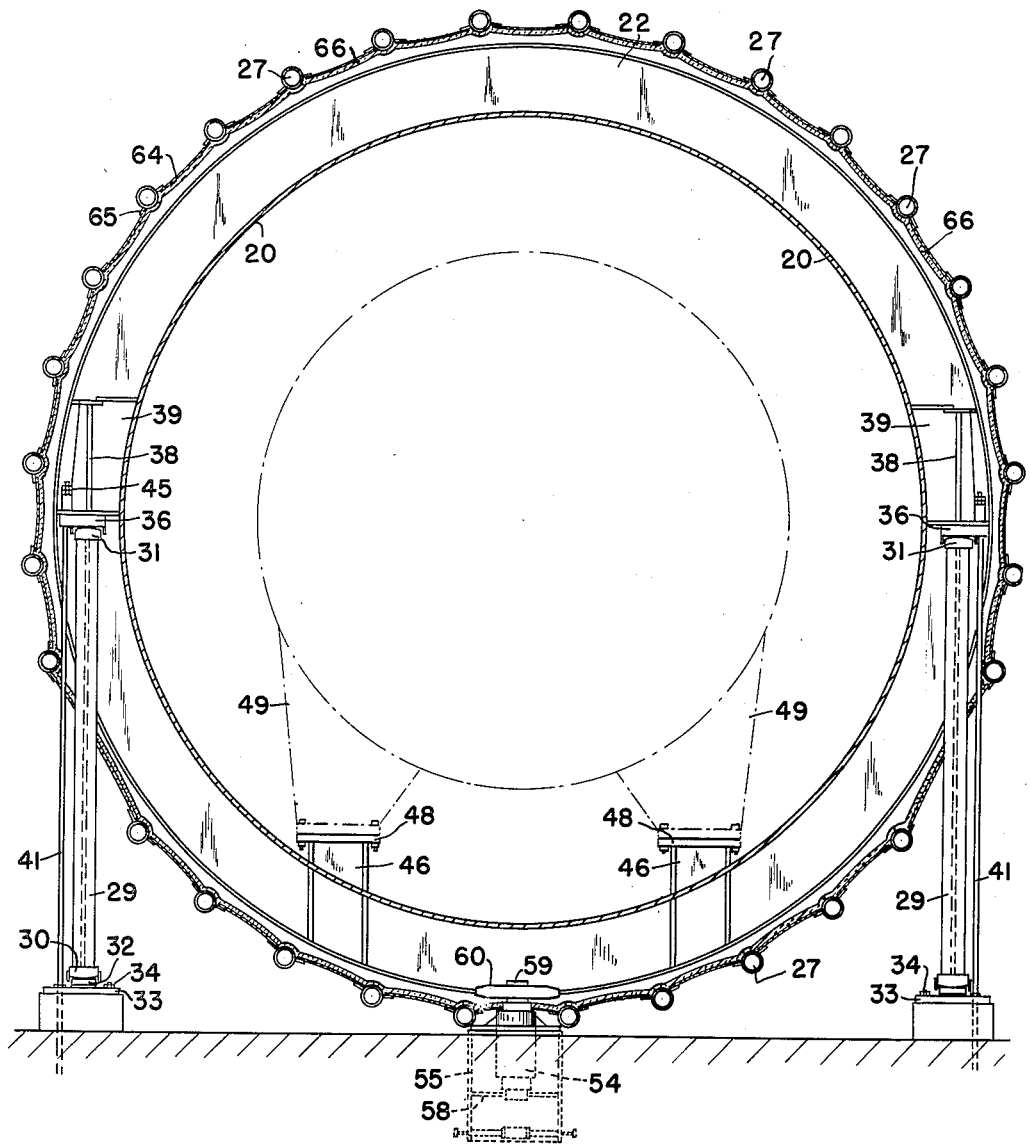
Fig. 3 is a transverse section of the duct section of Figs. 1 and 2 and is taken on line III—III of Fig. 1.

In this case I employ 30 struts or tie members 27 arranged in spaced relation as shown in Fig. 3. These struts or tie members are preferably tubular, and, since the duct of this invention in the form shown in this application is designed to form a pressure shell or housing for a series of air compressor units, each strut 27 is formed in sections. These sections are connected together by disconnectible couplings, portions of each of which are rigidly secured to one of the pair of stiffening and supporting ring members 22 located between each two adjacent expansion joints 21.

These couplings which are numbered 28 as an entirety and are shown in more or less detail in Figs. 13, 14 and 15, are made disconnectible in order that hatches, not shown, but which comprise shell sections and stiffening ring sections above the air compressors may be removed for the purpose of giving access to such compressors.

In straight duct sections embodying this invention in its simplest aspect where hatches are not necessary, plain tubular struts may be rigidly secured to one stiffening and supporting ring member 22 between each two adjacent expansion joints in any suitable manner and without the use of disconnectible couplings.

The 30 tubular struts or tie members as the case may be extend over the entire length of the duct shell and their manner of attachment to the duct shell enables them to transit their reactions into such shell.

Since the duct shell may be subjected to either internal or external pressure or both, members 27, if the pressure is internal, will be tie members, that is, they will take only tension. If the duct is subjected to a vacuum, that is to external pressure, members 27 will be compression members or struts. For the purposes of this application, the term "pressure struts" is intended to include both struts and tie members.

Each of the stiffening rings 22 is in effect a double ring built up from suitable plate material. Where stiffening rings 22 are to serve as support rings for air compressors or the like, that portion of metal shell 20 lying within the same, as shown in Fig. 7, is formed of extra heavy plate material 20b.

This double stiffening ring as disclosed in Fig. 7 comprises two built-up (as by welding) I-beams having separated flanges 22a—22a, webs 22b and flanges which are connected and comprise the extra heavy plate shell 20b; the same weight material as flanges 22a.

Duct shell supports

This straight duct section is supported on 18 columns, nine on each side.

These columns which are shown in detail in Fig. 6, are numbered 29 and each has a steel slab 30 welded to its bottom and a similar slab 31 welded to its top. The bottom surface of bottom slab 30 and the top surface of top slab 31 each has the form of a section of a sphere.

The bottom spherical surface bears on the flat horizontal surface of a slab 32 which is supported on a base plate 33 secured to the concrete foundation by means of anchor bolts 34. Shims 35 are interposed between slab 32 and base plate 33 for leveling purposes.

The spherical top surface of slab 31 bears against the under flat horizontal surface of a slab 36 which is secured by welding to a horizontal plate member 37 secured within the double I-beam structure comprised in stiffening ring 22 as shown in Figs. 6 and 7.

Vertically extending plate members 38 secured to web members 22b and vertical members 39 and 40 extending outwardly from section 20b of the duct shell, assist in transmitting the shell load to columns 29.

The spherical ends of columns 29 permit sufficient tilting of such columns to care for expansion and contraction of the duct shell. Anchor rods 41 (one associated with each column 29) anchor the duct structure to the foundation. These anchor rods which are pre-stressed, extend through openings formed in base plate 33 and into the concrete foundation. Each anchor rod 41 is provided with a collar 42 which rests on base plate 33 and which is welded both to the anchor rod and the base plate. The upper end of each anchor rod passes through openings in slab 36 and plate member 37, is screw threaded, and above plate member 37 passes through a sleeve 43 which rests on such plate member. A washer 44 rests on the top of sleeve 43 and forms a seat for a nut and lock nut combination 45 which is threaded to the upper end of such rod.

Air compressor supports

Since the cylindrical section of the duct shell of the drawings is designed to house four axially aligned air compressors, I provide means for anchoring the upstream ends of the stator shells or housings of such compressors in line with the upstream stiffening and supporting ring members 22 which have their positions fixed longitudinally of shell 20 by pressure struts 27.

I also provide means for supporting the downstream ends of such compressor shells or housings in line with the downstream stiffening support ring members 22; such means being formed to support the downstream ends of such stator shells or housings while permitting relative longitudinal movement between the same.

In Figure 1 the fixed supports for the upstream ends of the four compressors are numbered 46 while the supports for their downstream ends are numbered 47.

It will be seen from Figure 1 that the fixed supports 46 are in line with the stiffening and support rings 22 which are held in fixed position by pressure struts 27, and supports 47 for the downstream ends of such compressors are in line with stiffening and support rings 22 that are not held in fixed position by such pressure struts 27.

In Figure 3, supports 46 which are typical for the supports for the upstream ends of the compressor shells or casings and which are welded to portions 20b of shell 20 and the stiffening ring flanges 22a are provided with top members 48 to which legs 49 of the compressor casing may be bolted.

In Fig. 8, supports 47 which are utilized for the downstream supports for the downstream ends of the compressors are disclosed. These supports, like supports 46 are welded to portions 22b of shell 20 in line with a downstream stiffening and supporting ring member 22. Each such support is provided with a top member 50 which is provided with a raised portion 51 extending longitudinally of the duct and formed to cooperate with grooved rollers 52 carried by legs 53 for the downstream ends of a compressor casing.

*Means for anchoring the fixed portions of the duct shell to the foundation*

This anchor comprises a vertically extending shear pin 54 supported within a reinforced steel shell 55 which is embedded in the concrete foundation. This shell is provided with a cover plate 56 having radiating wings 57 which serve as braces for the shear pin. A lower inner plate 58 engages the shear pin adjacent its lower end.

The upper end 59 of the shear pin which in this case is 24 inches in diameter, has a sliding fit within an opening in a reinforcing member 60 which is secured to flanges 22a of the stiffening and support ring member 22 in line with upstream supports 46 of the second compressor unit from the upstream end of the cylindrical portion 20 of the duct shell.

This shear pin comprises anchoring means which, in cooperation with pressure struts 27, anchors the upstream suports 46 for the upstream ends of the compressor units, to the foundation and permits changes in diameter of the duct shell due to expansion and contraction of the same.

Extending along the bottom of the duct structure and secured to flanges 22a of stiffening and support ring members 22, in line with shear pin 54, are a series of downwardly extending guide members 61 which embrace opposite sides of guide posts 62 which are embedded in the concrete foundation; there being a pair of guide members 61 and a guide post 62 for each pair of compressor supports 46 and 47, except that there are no supports 46 for the shell adjacent the second compressor unit from the upstream end, since shear pin 54 renders the same unnecessary.

*Expansion joints 21*

Figures 11 and 12 disclose the preferred construction of expansion joints 21. In this case, each such joint comprises a number of sections 21a which are welded together end to end, are made of $\frac{5}{16}$" steel plate-like material bent to the form of a hollow cylinder with the edges thereof separated as shown in Fig. 11 and welded stiffening spacer strips 63 which in turn are welded to the edges of adjacent plate sections of the duct shell 20.

*Shell insulation*

Tubular struts 27 are insulated from the shell structure by insulation comprising a water-tight steel jacket or envelope made up of sag plates 64 secured to flange members 65 which are welded to pressure struts 27 shown in Fig. 6. Insulating material 66 is held in place in contact with sag plates 64 by means of a metal screen 67 which is bolted to the sag plates by means of bolts 68. Baldwin-Hill two inch thick monoblock insulation has been found satisfactory in keeping pressure struts 27 at the ambient temperature and preventing them from becoming heated by the bypass shell, thus limiting their expansion and contraction to ambient temperature changes.

Figure 5 is included for the purpose of more or less schematically disclosing the manner in which my straight duct section can be utilized for housing a compressor system and serving, with the casings of the compressors, to form an annular bypass channel.

The compressor system of the wind tunnel of which the duct of this invention is designed to form a part, comprises five axially aligned axial flow air compressors. The four compressors following the first, are housed within my straight duct section.

The control of the compressor system will be such that from one to five of the compressors may be operated. Toward this end, provision will be made for the admission of air around the idle compressors by means of valve devices such as schematically shown in Fig. 5.

The position of the horizontal center line of the duct shell is fixed by support columns 29 and anchor rods 41, while shear pin 54, posts 62 and guide members 61 maintain alignment of the shafts of the four compressors housed by my straight duct shell.

When the wind tunnel is started cold, the temperature of the air in the compressor units will increase. Expansion of the compressor casings is provided for by rollers 52 and downstream supports 50 of each compressor casing. As the air warms up, duct shell 20 begins to expand. Axial expansion of the duct shell is absorbed by circumferentially extending expansion joints 21, and, as shell 20 increases in diameter both horizontally and vertically, its vertical center line is maintained by posts 62 and guide members 61. The horizontal center line as above pointed out, is maintained by support columns 29 and anchor rods 41 because the expansion above and below the tops of such columns will be equal.

Fig. 4 schematically illustrates one way in which a wind tunnel circuit can be provided with flexible joints so as to operate properly with a straight duct shell of this invention. Corner B must be provided with guide means which limits its motion to the direction in which line 69 extends. This line 69 represents the longitudinal axis of the compressor system. Leg BC of the tunnel would then expand lengthwise and would move crosswise, radiating at support points along lines drawn from the vertical axis of shear pin 54; this being fixed point FP. Corner D would be allowed to move in any direction.

Expansion joints 70, 71 and 72 should be provided in the shell of the tunnel to permit corner D to swivel and to compensate for different temperatures in legs AB and BCDA.

Expansion joint 72 is required in order to make expansion joints 70 and 71 function properly and to provide for local differences in temperature in the tunnel circuit. Expansion joints 70, 71 and 72 should be tied by members 73, 74 and 75 capable of taking the maximum axial load in the tunnel shell.

Expansion joints 70, 71 and 72 may take the form of expansion joints 21 and tie members 73, 74 and 75 can take the form of pressure struts.

What I claim is:

1. A horizontal straight duct section to be operated either above or below ambient temperature, comprising a metal shell made up of tubular sections connected together by circumferentially extending expansion joints, support members extending outwardly from such tubular sections, multiple pressure struts paralleling the longitudinal axis of such metal shell, means connecting said pressure struts to such support members, and an envelope of heat insulating material surrounding but spaced from such shell and secured to such pressure struts.

2. A horizontal straight duct section to be operated either above or below ambient temperature, comprising a metal shell made up of tubular sections connected together by circumferentially extending expansion joints, stiffening ring members extending outwardly from such tubular sections, multiple pressure struts paralleling the longitudinal axis of such metal shell, means connecting said pressure struts to said stiffening ring members, and an envelope of heat insulating material surrounding but spaced from such shell and secured to said pressure struts.

3. A horizontal straight duct section to be operated either above or below ambient temperature, comprising a metal shell made up of tubular sections connected together by circumferentially extending expansion joints, stiffening ring members extending outwardly from such tubular sections, parallel multiple tubular pressure struts paralleling the longitudinal axis of such metal shell, means connecting said pressure struts to said stiffening ring members, an envelope of heat insulating material surrounding but spaced from such shell and a metal jacket surrounding such envelope and which is secured to such pressure struts.

4. A horizontal straight section of an elastic fluid duct to be operated either above or below ambient temperature; such duct section comprising a metal shell made up of tubular sections secured together by circumferentially extending expansion joints, at least one stiffening ring member secured to such tubular section, multiple pressure struts located adjacent the outer circumference of such stiffening ring members, means connecting such pressure struts to said stiffening ring members, and heat insulating material surrounding such shell and located between such pressure struts and said stiffening ring members.

5. A horizontal straight section of an elastic fluid duct to be operated either above or below ambient temperature; such straight duct section comprising a metal shell made up of tubular sections connected together by circumferentially extending expansion joints, a pair of stiffening ring members secured to each such tubular section, multiple spaced parallel pressure struts paralleling the longitudinal axis of such shell section and located adjacent the outer circumference of said stiffening ring members, means connecting such pressure struts to the upstream stiffening ring member of each such pair of ring members, and an envelope of heat insulating material surrounding such shell and located between said pressure struts and said stiffening ring members.

6. A straight section of a closed pressure duct to be operated either above or below ambient temperature; such duct section comprising a horizontal metal shell made up of tubular sections secured together by circumferentially extending expansion joints, at least one pair of encircling stiffening ring members secured to each such tubular section, multiple parallel tubular pressure struts paralleling the longitudinal axis of such metal shell and located beyond but adjacent the outer circumference of said stiffening ring members, means connecting said struts to at least one stiffening ring member of each such pair, and an envelope of heat insulating material surrounding such shell, secured to said pressure struts and located between said struts and said stiffening ring members.

7. A straight section of a closed pressure duct to be operated either above or below ambient temperature; such duct section comprising a horizontal metal shell made up of tubular sections connected together by circumferentially extending expansion joints, a pair of encircling stiffening ring members secured to each such tubular section, multiple parallel tubular pressure struts paralleling the longitudinal axis of such metal shell and located beyond but adjacent the outer circumference of such stiffening ring members, means connecting such pressure struts to the corresponding ring member of each such pair, an envelope of heat insulating material surrounding such shell, secured to such pressure struts and located between such struts and such stiffening ring members, tiltably mounted support columns associated with each such pair of stiffening ring members for supporting such metal shell above the ground, an anchor rod associated with each such support column; each such anchor rod being pre-stressed and being connected to such stiffening ring member adjacent the horizontal center line of such shell, and a foundation member immediately adjacent each such support column.

8. A straight section of a closed pressure duct to be operated either above or below ambient temperature; such duct section comprising a horizontal metal shell made up of tubular sections connected together by circumferentially extending expansion joints, a pair of encircling stiffening ring members secured to each such tubular section, multiple parallel tubular pressure struts paralleling the longitudinal axis of such metal shell and located beyond but adjacent the outer circumference of such stiffening ring members, means connecting such struts to one such ring member of each such pair of ring members, an envelope of heat insulating material surrounding such shell, secured to such struts and located between such struts and such stiffening ring members, a concrete foundation, means for supporting such straight shell section so that it is free to expand above and below its horizontal center line; such means comprising a pair of spherical ended columns associated with each pair of stiffening ring members, each such column bearing at its lower end on a metal slab anchored to such concrete foundation and at its upper end on a metal slab secured in position within one of such stiffening ring members, and a pre-stressed anchor rod associated with each such support column for tightly tying such duct shell to such foundation.

9. A straight section of a closed pressure duct to be operated either above or below ambient temperature; such duct section comprising a horizontal metal shell made up of tubular sections connected together by circumferentially extending expansion joints, at least one pair of spaced encircling stiffening ring members secured to each such section, multiple parallel tubular pressure struts located beyond but adjacent the outer circumference of such stiffening ring members, means connecting such pressure struts to at least one ring member of each such pair, an envelope of heat insulating material surrounding such shell, secured to such pressure struts and located between said struts and said stiffening ring members, a concrete foundation, means for supporting such metal shell so that it is free to expand above and below its horizontal center line; such means comprising spherical ended columns associated with the stiffening ring members to which such struts are secured; each such column bearing at its lower end on a steel slab anchored to said concrete foundation and at its upper end on a steel slab secured in position within said stiffening ring member, and a pre-stressed anchor rod associated with each such support column for tightly tying the shell structure to the foundation.

10. In a wind tunnel, the combination of multiple tubular shell sections connected end to end to form a closed duct structure, foundation means below such structure, spaced pairs of tiltable columns engaging opposite side portions of such duct structure for supporting such structure above such foundation means; at least one of such tubular shell sections being straight and being provided with spaced circumferentially extending expansion joints, at least one stiffening ring member secured to such shell section between each two adjacent expansion joints, multiple parallel pressure struts secured to such ring members adjacent their outer circumference for preventing relative longitudinal movement between such stiffening ring members, heat insulating material surrounding such shell section between such pressure struts and such stiffening ring members and anchor means adjacent one such stiffening ring member for anchoring the same to the foundation means; such anchor means being constructed and arranged to allow relative vertical movement of such shell section with relation to such foundation means and to prevent relative longitudinal movement between the anchored portion of such shell section and such foundation means.

11. In a wind tunnel, the combination of multiple tubular shell sections connected end to end to form a closed duct structure, foundation means below such structure, spaced pairs of tiltable columns engaging opposite side portions of such duct structure for supporting such structure above such foundation means; at least one of such tubular shell sections being straight and being provided with spaced circumferentially extending expansion joints, at least one stiffening ring member secured to such shell section between each two adjacent expansion joints, multiple parallel pressure struts secured to such ring members adjacent their outer circumference for preventing relative longitudinal movement between such stiffening ring members, heat insulating material surrounding such shell section between such pressure struts and such stiffening ring members, and a shear pin embedded in such foundation means and extending upwardly through an opening formed for its reception in one such stiffening ring member for anchoring the same to the foundation means; such anchor means being constructed and arranged to allow relative vertical movement of such shell section with relation to such foundation means and to prevent relative longitudinal movement between the anchored portion of such shell section and such foundation means.

12. The combination in a wind tunnel of at least one straight tubular shell section provided with spaced circumferentially extending expansion joints, foundation means below such section, spaced pairs of tiltable columns engaging opposite side portions of such shell structure for supporting such shell section above such foundation means, a stiffening ring structure secured to such shell section between each two adjacent expansion joints, multiple pressure struts paralleling the longitudinal axis of such shell section and secured to said stiffening ring structures adjacent their outer circumference for preventing relative movement longitudinally of such shell section between said stiffening ring structures, heat insulating material surrounding such shell section and located between said pressure struts and said stiffening ring structures, and a vertically extending shear pin embedded in said foundation means and extending upwardly through an opening formed for its reception in one such stiffening ring structure for anchoring the immediately adjacent portion of such shell section to the foundation means; such shear pin and co-operating stiffening ring structure being so constructed and arranged as to allow relative vertical movement of such shell section with relation to said foundation means and prevent relative longitudinal movement between said stiffening ring structure and such foundation means.

13. The combination in a wind tunnel of at least one straight tubular shell section provided with spaced circumferentially extending expansion joints, foundation means below such section, spaced pairs of tiltable columns engaging opposite side portions of such shell structure for supporting the same above such foundation means, a stiffening ring structure secured to such shell section between each two adjacent expansion joints, multiple pressure struts paralleling the longitudinal axis of such shell section and secured to such stiffening ring structures adjacent their outer circumference for preventing relative longitudinal movement between such stiffening ring structures, heat insulating material surrounding such shell section and located between such pressure struts and such stiffening ring structures, a vertically extending shear pin embedded in such foundation means and extending upwardly through an opening formed for its reception in one of said stiffening ring structures for anchoring the immediately adjacent portion of such shell section to the foundation means; such shear pin and co-operating stiffening ring structure being so constructed and arranged as to allow relative vertical movement of such shell section with relation to such foundation means and prevent relative lateral movement between said stiffening ring structure and said foundation means, and means for maintaining in fixed position the vertical plane which includes the longitudinal axis of the straight shell section; such means comprising spaced vertically extending post-like members embedded in such foundation means and guide members secured to the shell structure and co-operating with such post-like members.

JAMES O. JACKSON.

REFERENCES CITED

The following references are of record in the file of this patent:

UNITED STATES PATENTS

| Number | Name | Date |
|---|---|---|
| 2,307,915 | Boardman | Jan. 12, 1943 |
| 2,451,146 | Baker | Oct. 12, 1948 |
| 2,468,902 | Villiger | May 3, 1949 |
| 2,493,404 | Haynes | Jan. 3, 1950 |